United States Patent

[11] 3,589,518

[72] Inventors Georges Brebion
 Itteville;
 Bernard Huriet, La Ferte-Alais, both of, France
[21] Appl. No. 813,391
[22] Filed Mar. 6, 1969
[45] Patented June 29, 1971
[73] Assignee Ircha Institut National De Recherche Chimique Appliquee
 Paris, France
 Continuation of application Ser. No. 524,612, Feb. 2, 1966.

[54] PACKING MATERIALS ESPECIALLY FOR BIOLOGICAL FILTERS
 7 Claims, 14 Drawing Figs.
[52] U.S. Cl. .................................................. 210/150
[51] Int. Cl. ............................................... B01d 35/00
[50] Field of Search ........................................... 210/17,
 150, 151, 346, 347; 261/DIG. 11, 112

[56] References Cited
UNITED STATES PATENTS

| 2,183,657 | 12/1939 | Page | 210/150 X |
| 2,542,681 | 2/1951 | Kinner et al. | 261/112 X |
| 2,739,118 | 3/1956 | Carey | 210/150 X |
| 3,113,102 | 12/1963 | Schulze | 210/150 |
| 3,227,429 | 1/1966 | Renzl | 210/150 X |
| 3,285,587 | 11/1966 | Huber | 261/112 X |
| 3,329,271 | 7/1967 | Warb et al. | 210/150 |

FOREIGN PATENTS

| 937,597 | 9/1963 | Great Britain | 210/150 |

Primary Examiner—John Adee
Attorney—McDougall, Hersh, Scott & Ladd

ABSTRACT: A streaming filter to purify polluted waters by bacteriological aerobic action comprising a plurality of units arranged juxtaposed in substantially vertical alignment, each of said units comprising a thin walled structure having continuous exchange surfaces throughout the entire height of said filter, said structure having the form of a cylinder comprising an internal cellular structure integral with said cylinder obtained by the extrusion of a plastic material rigid in the cold state for a length equal to the useful height of said filter.

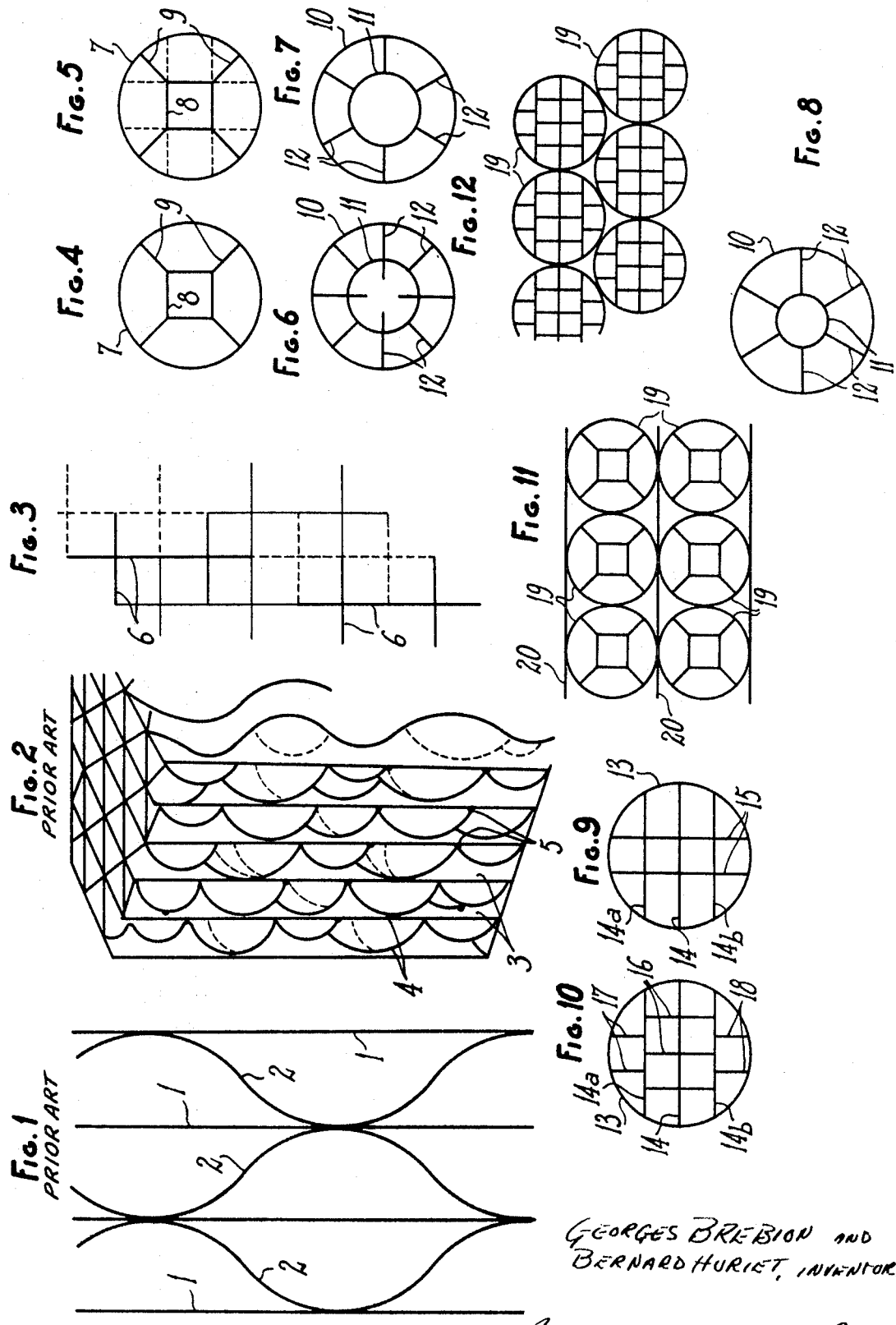

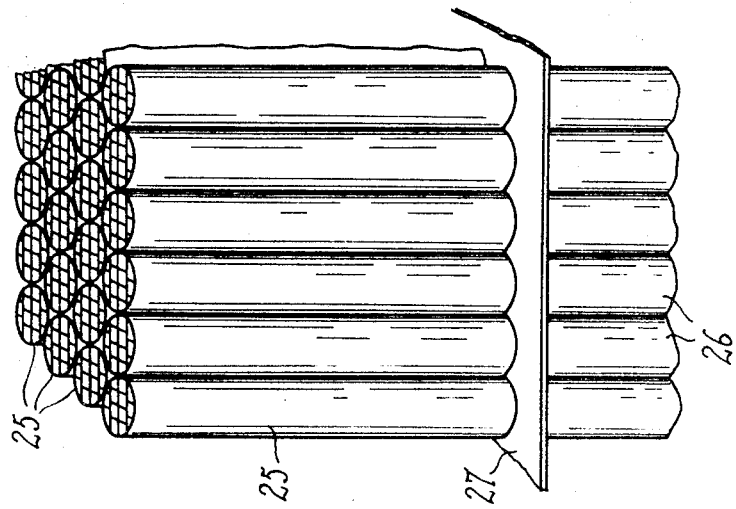
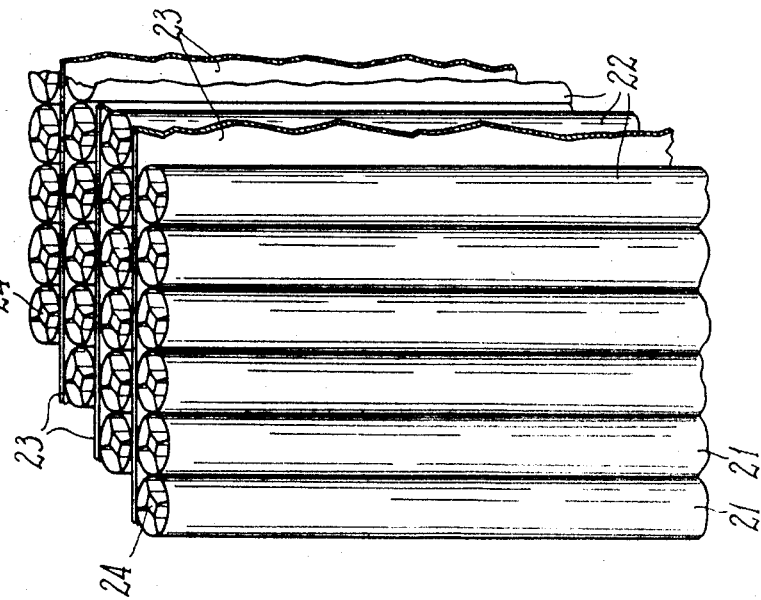

PACKING MATERIALS ESPECIALLY FOR BIOLOGICAL FILTERS

This is a continuation of our copending application Ser. No. 524,612, filed Feb. 2, 1966, and entitled "Packing Materials Especially for Biological Filters."

This invention relates to materials for packing biological filters and more particularly streaming bacterial filters of the oxidation tower type utilized for purifying polluted waters.

Hitherto known materials for packing oxidation towers consist of plastic materials such as polyvinyl chloride in the form of blocks juxtaposed, alternatively flat and corrugated sheets (see FIG. 1 of the attached drawings) electrically welded to one another to constitute a rigid block. These blocks of known type have a volume of 15½ cu. ft. (0.436 cu.m.) and weight 55 lbs. (±10 lbs.) or 25 kilograms (±5 kg.), that is, about 31.2 lbs. per cu. ft. (50 kg. per cu. m.) of bacterial bed.

Other bacterial beds consist of rigid elements made of juxtaposed, alternatively flat and corrugated sheets. The flat sheets are perforated and fit on the corrugated sheets having notches formed on one face and carry on their other face studs adapted to fit in the perforations of said flat sheets; these studs are subsequently fastened by gluing in the notches formed in the corresponding face of the underlying corrugated sheet (see FIG. 2 of the attached drawing). Under these conditions, a rigid block having a useful surface of 26.2 sq. ft. per cu.ft. (86 sq. m. per cu. m.), the weight of this block being about 77.3 lbs. (35 kg.). As a rule, the corrugated sheets formed with said studs and notches are produced by molding.

These known filter-packing materials constituting the bacterial beds of the prior art are characterized inter alia by the following advantages: a reduced floor area, due to their vertical construction; a very considerable surface per volume unit of bacterial bed, since their useful surface may be as much as 36.6 sq. ft. per cu. ft. (120 sq. m. per cu.m.) of bacterial bed; a considerable empty space, of the order of 97 percent, uniformly distributed and capable of producing an oxygenation superior to that obtained with a conventional bacterial bed consisting of stacked inert materials; it is also capable of supporting considerable polluting loads per volume unit; and finally, the engineering cost necessary for implementing this material is appreciably lower than that required for implementing conventional bacterial beds of the aforesaid type (stacked inert materials).

It is the essential object of the present invention to provide materials for packing biological filters such as bacterial beds, which are characterized by features and advantages still superior to those of the packing materials just described, notably in that they permit of dispensing with the welding or gluing of the elements constituting a block with one another, in that they permit of further increasing the exchange surface per square foot of the bacterial beds, and finally that they ensure a better elimination of BOD (Biochemical Oxygen Demand) per day and per square foot of the plate in the bacterial beds.

It is another object of this invention to provide materials for packing biological filters such as bacterial beds, which are characterized in that they consist of sections, possibly inserted in tubular structures.

According to an advantageous arrangement of the subject matter of this invention, the packing materials constituted by said sections are assembled by simply fitting them into one another.

According to another advantageous arrangement consistent with the present invention, the sections are solid with the tubular structures surrounding them.

According to a third advantageous arrangement of the subject matter of this invention, the tubular structures in which said sections are inserted are stacked on one another.

According to a preferred form of embodiment of this arrangement, a plurality of tubular structures are juxtaposed and the linear rows thus obtained are stacked on one another by interposing a support such as a flat sheet or plate between two superposed rows.

According to another preferred form of embodiment of this arrangement, said linear rows of tubular structures are stacked directly on one another, without interposing any support means therebetween.

According to a third preferred form of embodiment of the subject matter of the present invention, the tubular structures in which said sections are incorporated are so juxtaposed that their longitudinal centerline extends vertically to constitute a structure resembling an "organ pipes" structure.

According to a fourth preferred form of embodiment of the subject matter of this invention, a plurality of tubular structures disposed in the fashion of "organ pipes" are juxtaposed to one another.

According to an advantageous arrangement of this form of embodiment, two adjacent juxtaposed rows are separated by a flat plate disposed parallel to the longitudinal centerline of the tubular structures, that is, vertically.

According to another advantageous arrangement of this specific form of embodiment, two adjacent juxtaposed rows are disposed side by side without any interposition of separating plates, each tubular structure of a row fitting into the partial gap created by the tangent relationship of two juxtaposed tubular structures of the adjacent row.

According to a third advantageous arrangement of this specific form of embodiment, juxtaposed rows of tubular structures constituting "organ pipes" are superposed to one another.

One form of embodiment of this last described arrangement contemplates the superposition of rows of tubular structures with the interposition of a support such as a flat plate separating two successive superposed rows.

In another form of embodiment of this specific arrangement, rows of tubular structures are superposed to one another without interposing any support means therebetween.

In addition to the arrangements broadly described hereinabove, this invention further comprises other arrangements which will appear clearly from the following description.

The present invention is concerned more particularly with materials for packing biological filters according to the arrangements and dispositions set forth hereinabove, as well as the biological filters incorporating these packing materials, and the installations for cleaning or purifying waters by a biological cooling water which incorporate biological filters comprising the packing materials according to the present invention, as well as the installations used for purposes other than the biological filtration of waters to be purified, notably for cooling water This invention will be better understood by referring to the complementary description given hereinafter in connection with the accompanying drawings, in which—

FIGS. 1 and 2 are diagrammatic views showing packing materials of known type;

FIGS. 3 to 10 are diagrammatic illustrations of various forms of embodiment of sections according to this invention;

FIGS. 11 to 12 illustrate diagrammatically two typical methods of stacking tubular structures having the packing section inserted therein, according to the specific arrangements of the present invention;

FIG. 13 illustrates diagrammatically in perspective a typical arrangement of rows of tubular structures of the type illustrated in FIG. 4, which are juxtaposed with the interposition of separating plates; and FIG. 14 is a diagrammatic perspective view showing an arrangement of tubular structures of the type illustrated in FIG. 10, which are juxtaposed in staggered relationship without any interposition of separating plates between two adjacent juxtaposed rows.

However, it is emphasized herein that the drawings and the corresponding descriptive parts of this specification are given only by way of example and should not be construed as limiting the scope of the present invention.

FIGS. 1 and 2 illustrate filter-packing materials consisting of juxtaposed, alternately flat and corrugated sheets, of the type described in the preamble of this specification; thus, more particularly, FIG. 1 illustrates flat sheets 1 assembled by welding to corrugated sheets 2, and FIG. 2 shows flat perforated sheets 3 and corrugated sheets 4 formed with studs 5 engaging the perforations of said sheets 3.

FIGS. 3 to 12 illustrate diagrammatically pacing materials for biological filters according to the provisions of the present invention, and more particularly:

FIG. 3 shows sections 6 of any suitable configuration which are assembled by simply fitting into one another, without resorting to any mechanical means, to constitute strong structures adapted to be easily and rapidly assembled. The component elements of these sections consist of any suitable material, more particularly polyvinyl chloride; if this material is used in the manufacture of these sheets, the latter are advantageously shaped to reduce their weight for example to about 7 oz. per linear foot (0.2 kg. per linear meter), and the length of each element is immaterial, for example of the order of 20 ft. (6 m.) or more. The assemblies thus obtained constitute extremely efficient packing materials in bacterial filters of the streaming type in oxidation towers.

The packing materials constituted by tubular structures which various sections are inserted constitute likewise efficient contact masses in biological filters for purifying waste or polluted waters.

Such packing materials, of the type shown in FIGS. 4 to 10 of the drawings, may consist, as illustrated more particularly in FIGS. 4 and 5, of a tube 7 having inserted therein a hollow, square-sectioned element 8 formed with radial fins or ribs which may be, for example, either four in number, as shown in FIG. 4, and in thick lines in FIG. 5, or eight in number, as shown in dotted lines in FIG. 5, so as to connect this element 8 to the surrounding tube 7.

The packing materials may also consist, as shown in FIGS. 6 to 8, of a pair of concentric tubes 10 and 11 of variable diameter, interconnected by transverse fins 12.

Another form of embodiment of the packing materials according to this invention is illustrated in FIGS. 9 and 10. They consist in this example of a main tube 13 having network-forming elements disposed therein. The network illustrated in FIG. 9 consists of the regular intercrossing of elements 14 of a width corresponding to the inner diameter of the tube 13, and elements 14a and 14b parallel to said element 14, with narrower elements 15 intersecting said elements 14, 14a and 14b at right angles; the network shown in FIG. 10 comprises one element of a width equal to the inner diameter of the tube, and two elements 14a and 14b parallel to said element 14, and elements 16 interconnecting the elements 14a and 14b, the circular arc bounded by said element 14a being divided by other elements 17 while the circular arc bounded by element 14b is divided by further elements 18 into a plurality of hollow sections.

The packing materials illustrated in FIGS. 4 to 10 may be made from any suitable material, notably plastic, such as P.V.C., by extrusion or any other suitable process. By way of example, the packing materials of the type illustrated in FIGS. 4 to 10, when made from P.V.C., may be extruded to have a weight of the order of 1.1 lb. per linear foot (500 grams per linear meter), whereby they can easily be handled without resorting to any mechanical means, considering the fact that the stackings obtained therefrom in the manufacture of streaming bacterial filters of the oxidation tower type do not require likewise any gluing or welding operation.

These stackings, of which two typical examples are illustrated in FIGS. 11 and 12, may consist of aligned rows of tubes 19 according to this invention on plates 20, preferably P.V.C., although the choice of the material is immaterial, said plates 20 being superposed to constitute a stacking of the type illustrated in FIG. 11; the stackings constituting the oxidation towers may also consist of tubes 19 according to this invention, which are superposed to constitute stacked assemblies without the interposition of a plate (see FIG. 12).

Referring now to FIG. 13, it will be seen that each one of the juxtaposed rows 22 is separated from the adjacent rows by a flat plate 23 advantageously made of P.V.C., the same procedure may also apply to the tubular structures 21. The exchange surface of plates 23 adds itself to the inherent exchange surfaces of the tubular structures which is variable as a function of the type of sections inserted therein. In an arrangement of the type illustrated in FIG. 13, the exchange surface, including the partition plates, is of the order of 56.6 sq. ft. per cu.ft. (186 sq. m. per cu.m.), in case that the sections 24 inserted in the tubular structures 21 are of the type shown in FIG. 4.

The juxtaposed rows 25 of tubular structures 26 may also be disposed without interposing partition plates between two adjacent rows, as shown in FIG. 14, whereby the exchange surface of the packing materials may be further increased with respect to that obtained with the arrangement illustrated in FIG. 13. In the case of arrangements comprising tubular structures of the type illustrated in FIG. 10, exchange surfaces of the order of 65.5 sq.ft. per cu.ft. (215 sq.m. per cu.m.) may be obtained but of course the figures given hereinabove may vary as a function of the exchange surface of the sections inserted in the tubular structures.

On the other hand, the height of certain installations for purifying, cleaning or cooling waste waters and the like may require the super position of juxtaposed tubular structures. This superposition may be effected either by simply interfitting the superposed tubular structures, or disposing the tubular structures of the superposed rows in the gaps formed between the tubular structures of the underlying juxtaposed rows. In certain cases, it may also be advantageous to support the superposed rows by means of an intermediate perforated plate 7 interposed between the lower and upper rows.

The exchange surface afforded by resorting to these stacking methods are variable as a function of the diameter of the external tubes and also of the specific shape of the sections inserted therein, the variation of said surfaces being also subordinate to the specific sections utilized within these tubes; thus, assuming for example that the inner diameter of the external tubes shown in FIGS. 4 to 10 is 3¼ inches (80 mm.), this variation ranges from 38 to 72 sq.ft. per cu.ft. (125 to 237 sq.m. per cu.m.), according to the type of section inserted in the tubes. By way of example, the exchange surface of a tube of the type illustrated in FIG. 10, with an inner diameter of 3¼ inches (80 mm.), is 4.27 sq.ft. per linear foot (1.30 sq.m. per linear meter), so that a stacking constructed from these tubes may provide an exchange surface of the order of 57 sq.ft. per cu.m. (187 sq.m. per cu.m.) in the case of stackings consisting of superposed rows between which supporting plates are interposed, without taking into account the surface area of these plates; the exchange surface of the stackings obtained by using tubes containing sections of the type illustrated in FIG. 8 may even be as high as 65.5 sq.ft. per cu.ft. (215 sq.m. per cu.m.) in the case of stackings of the type illustrated in FIG. 12, without any supporting plates.

Also by way of example, stackings constructed from tubes of the type illustrated in FIG. 4 may provide an exchange surface area ranging from 45 sq.ft. per cu.ft. (150 sq.m. per c.m.) in the case of stackings of the type shown in FIG. 11, to 57 sq.ft. per cu.ft. (186 sq.m. per cu.m.) in the case of stackings of the type shown in FIG. 12.

The above figures, of course, are given by way of examples and should not be construed as limiting this invention; on the other hand, it is clear that other types of stackings, outside those illustrated in FIGS. 11, 12, 13 and 14, may be constructed by utilizing tubes or the like incorporating sections differing from those illustrated in FIGS. 4 to 10, the exchange surface area being further increased, if desired, with respect to the above oxemplary figures.

In an oxidation tower of conventional dimensions, it is considered that the number of tubes having a diameter of 3¼ inches (80 mm.) according to this invention which are utilized therein may range from about 13 per sq.ft. (144 per sq.m.) if they are disposed in superposed rows carried by supporting plates to about 15 per sq.ft. (165 per sq.m.) if they are stacked on one another without the interposition of supporting plates. Of course, the number of tubes utilized in a biological filter depends on the projected dimensions of this filter, on the tube diameter and also on the nature of the waters, waste liquors or other fluids to be treated.

From the above description it is clear that irrespective of the forms of embodiment, specific applications and modes of operation contemplated, packing materials for biological filters are obtained which are characterized by considerable advantageous features with respect to hitherto known packing materials in addition to the features already disclosed hereinabove, notably inter alia: the advantageous features of facilitating the manufacture, for example, by extrusion of the packing materials according to this invention; of permitting a considerable reduction in the floor space required for installations intended for removing an equivalent polluting charge; of ensuring a substantial increase in the useful surface per volume unit of the biological filter, which is substantially equal to or higher than twice the useful surface areas per square foot obtained with hitherto known biological filters, the consequence of this increment in useful surface area being primarily a reduction in engineering cost; of being clog free; of reducing to a substantial degree transport, handling and construction costs since the packing materials according to this invention do not require any specific care for their transport, and finally of permitting a remarkable increase in the exchange surface area per square foot of bacterial bed, thus, ensuring a better removal of BOD per day per square foot of bacterial bed surface.

More particularly, the increment in the useful surface area per volume unit is such that whereas in a known type of bacterial filter the BOD (Biochemical Oxygen Demand) from which the putrescibility of water can be determined is eliminated at the rate of 1 oz. per cu.ft. of bacterial filter per day (1 kg. per cu.m. per day), whereas the use of a streaming bacterial filter of the oxidation tower type will remove from 20 to 25 grams of BOD per day per sq.m. of plate, which under the most favorable conditions corresponds to 3 kg. of BOD removed per day in the case of an installation providing an exchange surface of 120 sq.m. per cu.m.; the bacterial filters constructed with the packing materials of the present invention will eliminate BOD at the average rate of 6 kg. per cu.m. per day.

From the foregoing it is apparent that this invention should not be construed as being limited by the specific forms of embodiment and application described more in detail hereinabove, since it covers all modifications likely to occur to those conversant with the art without departing from the spirit and scope of the invention; thus, notably, the packing materials according to this invention may be used to advantage in water-cooling towers, for example in steam power plants.

We claim:

1. A streaming filter to purify polluted waters by bacteriological aerobic action comprising a plurality of units of plastic material arranged juxtaposed in substantially vertical alignment, each of said units comprising a thin-walled structure having continuous exchange surfaces throughout the entire height of said filter, said structure having the form of a cylinder comprising an internal cellular structure integral with said cylinder, each of said units comprising an interior cylinder connected to the interior wall of said first named cylinder by radial fins.

2. A streaming filter to purify polluted waters by bacteriological aerobic action comprising a plurality of units of plastic material arranged juxtaposed in substantially vertical alignment, each of said units comprising a thin-walled structure having continuous exchange surfaces throughout the entire height of said filter, said structure having the form of a cylinder comprising an internal cellular structure integral with said cylinder, each of said units comprising a network having a plurality of partitions extending parallel to the axis of said cylinder and certain of said partitions intersect one another.

3. A streaming filter to purify polluted waters by bacteriological aerobic action comprising a plurality of units of plastic material interconnected one to another in juxtaposed superposed relation, each of said units comprising an elongate thin-walled, outer tubular member and an inner thin-walled member of geometric configuration spaced centrally inwardly from the outer tubular member, and thin fins extending radially from the interior of the outer tubular member to the inner member to interconnect one with the other in a network, with said inner and outer members extending continuously throughout the length of said tubular member to provide continuous exchange surfaces.

4. A streaming filter as claimed in claim 3 in which said units are stacked one on another.

5. A streaming filter as claimed in claim 4 which includes separator sheets between said stacked units.

6. A streaming filter as claimed in claim 3 in which said units are arranged in side-by-side relation.

7. A streaming filter as claimed in claim 6 in which the units are arranged in rows with separator sheets between adjacent rows.